United States Patent Office 3,205,260
Patented Sept. 7, 1965

3,205,260
PROCESS FOR THE PURIFICATION OF
TEREPHTHALIC ACID
Dino Costabello, Novara, and Francesco Minisci, Gioacchino Boffa, and Giuseppe Belvedere, Milan, Italy, assignors to Montecatini—Società Generale per l'Industria Mineraria e Chimica, a corporation of Italy
No Drawing. Filed Feb. 28, 1961, Ser. No. 92,178
Claims priority, application Italy, Mar. 2, 1960,
3,577/60; July 14, 1960, 12,375/60
4 Claims. (Cl. 260—525)

The present invention relates to a method for the purification of terephthalic acid containing p-toluic acid as impurity.

It is known that the terephthalic acid obtained by oxidation of p-xylene and p-cymene, is always mixed with a varying amount of p-toluic acid.

Different processes have been described for separating the two above mentioned acids. Processes such as the sublimation of the oily suspension, and the treatment with water at pressure near to the critical temperature, and selective extraction with different solvents do not lead to a sufficiently pure terephthalic acid.

We have now found that it is possible to separate the two acids by taking advantage of the different water solubilities of the corresponding calcium salts.

Crude terephthalic acid is treated with a boiling aqueous suspension of calcium oxide and the resulting soluble calcium p-toluate is separated by filtration from the insoluble calcium terephthalate. The calcium terephthalate residue is decomposed by hydrochloric acid and yields pure terephthalic acid. It is also possible to work at room temperature but in this case a longer treatment is necessary and the mixture of the crude acids must be highly pulverized.

A preferred embodiment of our process consists of solubilizing the crude terephthalic acid with alkaline agents or ammonia and then treating the solution with a soluble calcium salt. In this manner it is possible to easily separate any non-acid impurities possibly present in the crude product and to greatly reduce the duration of treatment since the precipitation of the calcium terephthalate occurs immediately after addition of mentioned calcium salt. This method also eliminates the necessity of finely pulverizing the crude product as is present in neutralization of the solid acid by calcium hydroxide.

The preferred process comprises the following operations: the crude terephthalic acid is treated with an alkaline solution or with ammonia; any possible insoluble residue is filtered off and discarded; a hot aqueous solution containing the stoichiometric amount of the soluble calcium salt (preferably calcium chloride) is added; the soluble calcium p-toluate is separated from the precipitated calcium terephthalate by filtration. The calcium terephthalate is washed with hot water and then decomposed by a dilute hydrochloric acid solution. A terephthalic acid with a degree of purity over 99% is obtained.

The following examples are given to illustrate, but not to limit, the scope of the present invention.

*Example 1*

A finely pulverized mixture of 90 g. terephthalic acid and 10 g. p-toluic acid (the mixture having an acidimetric equivalent of 88.3) is treated with 39 g. calcium oxide in 1000 cc. water under stirring and refluxing for 3 hours. The undissolved solid is then filtered off and washed with 400 cc. water. The washed residue is suspended in a hydrochloric acid solution by stirring. The resulting suspension is filtered and washed with water until the wash water contains neither chlorine nor calcium. The final product of 88.7 g. terephthalic acid, having an acidimetric equivalent equal to 83.1 (theoretical, 83), is obtained.

The filtrate is acidified with a hydrochloric acid solution, whereby 8.5 g. of a product having an acidimetric equivalent of 129 (the theoretical acidimetric equivalent of the p-toluic acid is 136) are precipitated.

*Example 2*

A mixture of terephthalic acid and p-toluic acid was obtained by precipitation from an aqueous solution of the corresponding alkaline salts. This mixture was then treated as in the above example.

Starting from 100 g. of a mixture having the acidimetric equivalent equal to 88.1, 8.3 g. of a product having an acidimetric equivalent of 128, and 89 g. of terephthalic acid having acidimetric equivalent equal to 83.3 (theoretical, 83) are obtained.

*Example 3*

A mixture of 80 g. terephthalic acid and 20 g. p-toluic acid (acidimetric equivalent 93.6) is treated with 37 g. calcium oxide in 1000 cc. water while stirring and refluxing for 4 hours. The undissolved solid is filtered and washed with 500 cc. water. Acidifying the filtrate with hydrochloric acid, 16.5 g. of a product having acidimetric equivalent 130 (theoretical for p-toluic acid 136) are obtained. 78.5 g. terephthalic acid having acidimetric equivalent 83.3 (theoretical, 83) are obtained upon decomposing the undissolved calcium salt with hydrochloric acid.

*Example 4*

10 g. crude terephthalic acid prepared by the oxidation of p-xylene and containing 6% of p-toluic acid, are dissolved in a 10% ammonia solution (the smallest amount to dissolve the acid); the solution is treated at boiling temperature with bone charcoal, filtered to produce liquid and solid fractions, and the liquid fraction is diluted with water to a volume of 1000 cc. 14 g. $CaCl_2 \cdot 6H_2O$ dissolved in 50 cc. water are added to the liquid fraction, while stirring at 90–100° C. The precipitated calcium terephthalate is filtered and poured into a 2 N HCl solution while stirring to produce 8.4 g. pure terephthalic acid, the degree of purity being greater than 99%. By acidifying the filtrate containing the calcium salts, 1.2 g. terephthalic acid containing 30% p-toluic acid are obtained.

*Example 5*

30 g. crude terephthalic acid are dissolved in ammonia and treated with bone charcoal as in the foregoing example. The mixture is then diluted to 1000 cc. and precipitated at boiling temperature with 42 g. $CaCl_2 \cdot 6H_2O$. The solid thus formed is filtered and extracted three times with 200 cc. hot water. By decomposing the residual solid with hydrochloric acid solution, 26 g. pure terephthalic acid are obtained (purity, 99%). By acidifying the filtered solution to which the extraction liquors have been added, 2.6 g. crude terephthalic acid containing 34% p-toluic acid are obtained.

Example 6

Following Example 5, but substituting the sodium salt of terephthalic acid for the ammonium salt of said example, the results remain unchanged.

Example 7

A mixture of 9 g. terephthalic acid and 1 g. p-toluic acid is dissolved into an ammonia solution and diluted with water up to 1000 cc. The mixture is precipitated by adding 14 g. $CaCl_2 \cdot 6H_2O$ in 50 cc. water at boiling temperature while stirring. The solid, after filtration, is extracted three times with 200 cc. hot water and is then decomposed with hydrochloric acid solution. 7.4 g. terephthalic acid with a purity of degree >99% are obtained. From the filtered liquors which have been added to the extraction liquors 1.8 g. of a mixture consisting of terephthalic and p-toluic acid are obtained by acidification.

We claim:

1. A process for the purification of terephthalic acid containing p-toluic acid as impurity, comprising the steps of treating the crude terephthalic acid with an aqueous solution of a soluble calcium salt whereby soluble calcium p-toluate and insoluble calcium terephthalate are obtained, separating said insoluble calcium terephthalate from said soluble calcium p-toluate and treating said calcium terephthalate with an aqueous hydrochloric acid solution to yield pure terephthalic acid.

2. A process for the purification of terephthalic acid containing p-toluic acid as impurity, comprising the steps of suspending crude terephthalic acid in water and treating with an aqueous sodium hydroxide solution, at temperatures between room temperature and the boiling temperature of the aqueous solution, adding an aqueous solution of a soluble calcium salt whereby soluble calcium p-toluate and insoluble calcium terephthalate are obtained, separating said insoluble calcium terephthalate from said soluble calcium p-toluate and treating said calcium terephthalate with an aqueous hydrochloric acid solution to yield pure terephthalic acid.

3. A process for the purification of terephthalic acid containing p-toluic acid as impurity, comprising the steps of dissolving the crude terephthalic acid in a 10% ammonium solution, adding bone charcoal to said ammonium solution containing said crude terephthalate dissolved therein, boiling the suspension produced, separating the boiled suspension into liquid and solid fractions, treating the liquid fraction with a solution of an aqueous soluble calcium salt whereby soluble calcium p-toluate and insoluble calcium terephthalate are obtained, separating said insoluble calcium terephthalate from said soluble calcium p-toluate and treating said calcium terephthalate with an aqueous hydrochloric acid solution to yield pure terephthalic acid.

4. A process for the purification of terephthalic acid containing p-toluic acid as impurity, comprising the steps of pulverizing crude terephthalic acid, refluxing said pulverized terephthalic acid with calcium oxide in an aqueous medium whereby soluble calcium p-toluate and insoluble calcium terephthalate are obtained, separating said insoluble calcium terephthalate from said soluble calcium p-toluate and treating said calcium terephthalate with an aqueous hydrochloric acid solution to yield pure terephthalic acid.

References Cited by the Examiner

UNITED STATES PATENTS

| 2,745,872 | 5/56 | Carlston et al. | 260—525 |
| 2,823,229 | 2/58 | Raecke et al. | 260—525 X |
| 2,931,820 | 4/60 | Schenk | 260—525 X |

FOREIGN PATENTS

| 777,782 | 6/57 | Great Britain. |
| 788,276 | 12/57 | Great Britain. |
| 793,921 | 4/58 | Great Britain. |

LORRAINE A. WEINBERGER, *Primary Examiner.*

LEON ZITVER, *Examiner.*